(12) United States Patent
Zhou et al.

(10) Patent No.: US 9,336,018 B2
(45) Date of Patent: May 10, 2016

(54) MECHANISM FOR CLASS DATA SHARING USING EXTENSION AND APPLICATION CLASS-LOADERS

(71) Applicant: Oracle International Corporation, Redwood City, CA (US)

(72) Inventors: Jiangli Zhou, San Ramon, CA (US); Ioi Lam, Mountain View, CA (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 0 days.

(21) Appl. No.: 14/634,385

(22) Filed: Feb. 27, 2015

(65) Prior Publication Data

US 2015/0317167 A1     Nov. 5, 2015

Related U.S. Application Data

(60) Provisional application No. 61/988,044, filed on May 2, 2014.

(51) Int. Cl.
*G06F 9/44* (2006.01)
*G06F 9/445* (2006.01)

(52) U.S. Cl.
CPC .................................... *G06F 9/445* (2013.01)

(58) Field of Classification Search
USPC ................. 717/107–109, 114–116, 166–174; 709/203
IPC ................................... G06F 8/24,9/4428, 9/445
See application file for complete search history.

(56) References Cited

U.S. PATENT DOCUMENTS

| | | | | |
|---|---|---|---|---|
| 6,959,320 B2* | 10/2005 | Shah | .......................... | G06F 8/65 709/203 |
| 7,234,137 B2* | 6/2007 | Taylor | ..................... | G06F 9/445 717/167 |
| 7,243,346 B1* | 7/2007 | Seth | ........................ | G06F 9/445 717/162 |
| 7,454,743 B2* | 11/2008 | Fuchs | ........................... | 717/108 |
| 7,590,863 B2* | 9/2009 | Lambert | ....................... | 713/189 |
| 7,784,043 B2* | 8/2010 | Atsatt | ..................... | G06F 9/445 713/2 |
| 7,941,402 B2* | 5/2011 | Smits | ............................ | 707/638 |

(Continued)

OTHER PUBLICATIONS

Zaparanuks et al, "The Potential of Speculative Class-Loading", ACM, pp. 209-214, 2007.*

(Continued)

*Primary Examiner* — Anil Khatri
(74) *Attorney, Agent, or Firm* — Precision IP

(57) ABSTRACT

The present disclosure involves systems, methods, and/or computer-readable mediums for reducing load time of an application. The systems, methods, and/or computer-readable mediums store metadata in an archive prior to execution of an application. The metadata corresponds to a type of class loading operation used to load a class required by the application, where different types of class loading operations perform different security checks as a part of loading classes. During execution of the application, based on the metadata and based in part on a request for the class loading operation to load the class, it is determined whether the class is stored in the archive. When the class is stored in the archive, a particular type of class loading operation loads the class from the archive and the system checks that the particular type of the class loading operation matches the type of the class loading operation in the metadata.

16 Claims, 6 Drawing Sheets

(56) References Cited

U.S. PATENT DOCUMENTS

| | | | | |
|---|---|---|---|---|
| 8,127,284 B2* | 2/2012 | Meijer | ................ | G06F 9/44521 |
| | | | | 717/166 |
| 8,473,938 B1* | 6/2013 | Feeser | ....................... | G06F 8/65 |
| | | | | 717/168 |
| 8,495,611 B2* | 7/2013 | McCarthy | ........... | H04L 41/0806 |
| | | | | 709/203 |
| 8,527,979 B2* | 9/2013 | Wookey | ........................ | 717/169 |
| 8,533,704 B2* | 9/2013 | Wookey | .................... | G06F 8/68 |
| | | | | 717/174 |
| 8,549,514 B2* | 10/2013 | Carteri | ..................... | G06F 8/61 |
| | | | | 717/103 |
| 8,626,806 B2* | 1/2014 | Larimore | ............ | G06F 9/45537 |
| | | | | 707/781 |
| 8,627,281 B2* | 1/2014 | Tatsubori | ..................... | 717/114 |
| 8,706,881 B2* | 4/2014 | Ramu | ................. | G06F 9/44521 |
| | | | | 709/226 |
| 8,738,589 B2* | 5/2014 | Stark et al. | .................... | 707/695 |
| 8,910,138 B2* | 12/2014 | Kuppala et al. | ............... | 717/166 |
| 8,959,106 B2* | 2/2015 | de Castro Alves et al. | ... | 707/768 |
| 8,966,464 B1* | 2/2015 | Christopher | ........ | G06F 11/0712 |
| | | | | 717/166 |

OTHER PUBLICATIONS

Schatzl et al, "Optimized Memory Management for Class Metadata in a JVM", ACM, pp. 151-160, 2011.*

Stock et al, "Metadata based Authoring for Technical Documentation", ACM, pp. 60-67, 2005.*

Qu et al, "Interoperable Metadata Semantics with Meta-Metadata: A Use Case Integrating Search Engines", ACM, pp. 171-174, 2011.*

* cited by examiner

MECHANISM FOR CLASS DATA SHARING USING EXTENSION AND APPLICATION CLASS-LOADERS

RELATED APPLICATIONS

This application claims priority under 35 U.S.C. §119 from U.S. provisional application No. 61/988,044 entitled "MECHANISM FOR CLASS DATA SHARING USING EXTENSION AND APPLICATION CLASS-LOADERS," filed on May 2, 2014, the entire contents of which are fully incorporated by reference herein for all purposes.

TECHNICAL FIELD

Aspects of the present disclosure relate to class loading during execution of a software application and more specifically a mechanism for archiving and reusing class metadata while still preserving class-loader context to enable faster class loading and support memory sharing by multiple processes.

BACKGROUND

A programming language is a formal constructed language designed to provide (communicate) instructions to a machine, particularly a computer. A typical programming language includes a vocabulary and set of grammatical rules for instructing the machine to perform specific tasks. Typically, a programming language is used to generate a software program that controls the behavior of the machine to express algorithms, or otherwise to cause the machine to perform some function or functions. Well-known programming languages include Java, Javascript, PHP, C++, Python, C, SQL, and Objective C.

Programming languages may use class loaders to load class files or other code-containing objects for execution. For example, the Java language uses a class loading mechanism to dynamically load class files of an application into the Java™ Virtual Machine during runtime. Loading classes from the extension and application classpath is a heavy-weight process (i.e., computationally intensive) that typically requires multiple classpath searches, JAR file lookups, class verification, etc. In a typical Java™ application environment, the total time required to perform class-loading may negatively impact overall application start-up time.

Class Data Sharing is a process that was implemented to resolve such start-up time issues by archiving loaded class metadata into a re-mappable form before the execution of an application. However, Class Data Sharing does not allow classes from the extension and application classpath to be stored in the archive without violating class-loader context and Java™ semantics, which can cause incorrect runtime behavior and security vulnerability.

Various examples described herein may use example terminology that coincides with terminology used for the Java programming language. Unless otherwise specified, such terminology is intended to be language-generic based on functional characteristics rather than implying any characteristics that are unique to the Java ecosystem. For example, a class is any named section of software code that can be invoked, including, but not limited to, a function, a method, a procedure, an object, and a Java class (i.e., "class" is not required to be a Java class). As another example, a class loader is any mechanism for loading a class prior to or during execution of code (i.e., a "classloader" is not required to be a Java classloader). In yet another example, a classpath is a parameter, set either on the command line, or through an environment variable that tells a computing environment and/or compiler, such as the Java virtual machine or the Java compiler, where to look for user-defined classes.

SUMMARY

Aspects of the present disclosure include methods for reducing load time of an application. The method includes, prior to execution of an application, storing metadata in an archive, the metadata corresponding to a class loading operation used to load a class required by the application, wherein the metadata identifies a type of the class loading operation and wherein different types of class loading operations perform different security checks as a part of loading classes. The method further includes, during execution of the application: based at least in part on a request for the class loading operation to load the class, determining, based on the metadata, whether the class is stored in the archive. When the class is stored in the archive loading, by a particular class loading operation of a particular type, the class from the archive; and checking that the particular type of the class loading operation matches the type of the class loading operation in the metadata.

Other aspects of the present disclosure include non-transitory computer readable medium encoded with instructions for reducing load time of an application. The instructions are executable by a processor or computing device. The instructions include, prior to execution of an application, storing metadata in an archive, the metadata corresponding to a class loading operation used to load a class required by the application, wherein the metadata identifies a type of the class loading operation and wherein different types of class loading operations perform different security checks as a part of loading classes. The method further includes, during execution of the application: based at least in part on a request for the class loading operation to load the class, determining, based on the metadata, whether the class is stored in the archive. When the class is stored in the archive loading, by a particular class loading operation of a particular type, the class from the archive; and checking that the particular type of the class loading operation matches the type of the class loading operation in the metadata.

BRIEF DESCRIPTION OF THE DRAWINGS

Aspects of the present disclosure may be better understood and its numerous objects, features, and advantages made apparent to those skilled in the art by referencing the accompanying drawings. It should be understood that these drawings depict only typical embodiments of the present disclosure and, therefore, are not to be considered limiting in scope.

DETAILED DESCRIPTION

Aspects of the present disclosure involve systems and/or methods for performing various class-loading processes, among other processes, during execution time of a computer program or software application developed using an object-oriented programming language, such as Java™. In various aspects, a system, such as a virtual machine, executing on a processing device, may access or otherwise request mechanisms of the programming language, referred to as "class-loaders," to dynamically load files containing interpretable code (e.g., bytecode) during the runtime of the software application. Prior to execution of the application (i.e., pre-processing), metadata, which corresponds to the class-loaders, is generated that may be used during a class-loading operation. The metadata may be stored, or otherwise maintained, in a shared archive and may include, for example, data that identifies a particular type of class-loader and/or class-loading operation for loading classes in the system. In other embodiments, the metadata may include classpath information that uniquely identifies the specific class files being loaded within the system. The metadata may further include an identifier, such as a URL path-string, of a more comprehensive archive file, such as a Java™ Archive (JAR) file that uniquely identifies files within the JAR file. In some embodiments, the metadata may include manifest data, resources, signatures, and/or binary information associated with the JAR file. The metadata may also include a pointer to any entry for any of the metadata, such as the identifier listed above that may be stored or otherwise maintained in a data structure, such as a table, which may group the metadata together.

Upon execution of the computer program or software application, the metadata and/or class-loaders may be used to perform a variety of security checks and/or optimizations when loading classes during runtime, such as: preserved class-loading delegation; class re-verification; package handling; protection-domain creation; protection-domain caching; and/or any other process associated with loading a class, as will be described in further detail below.

Figure 1A:
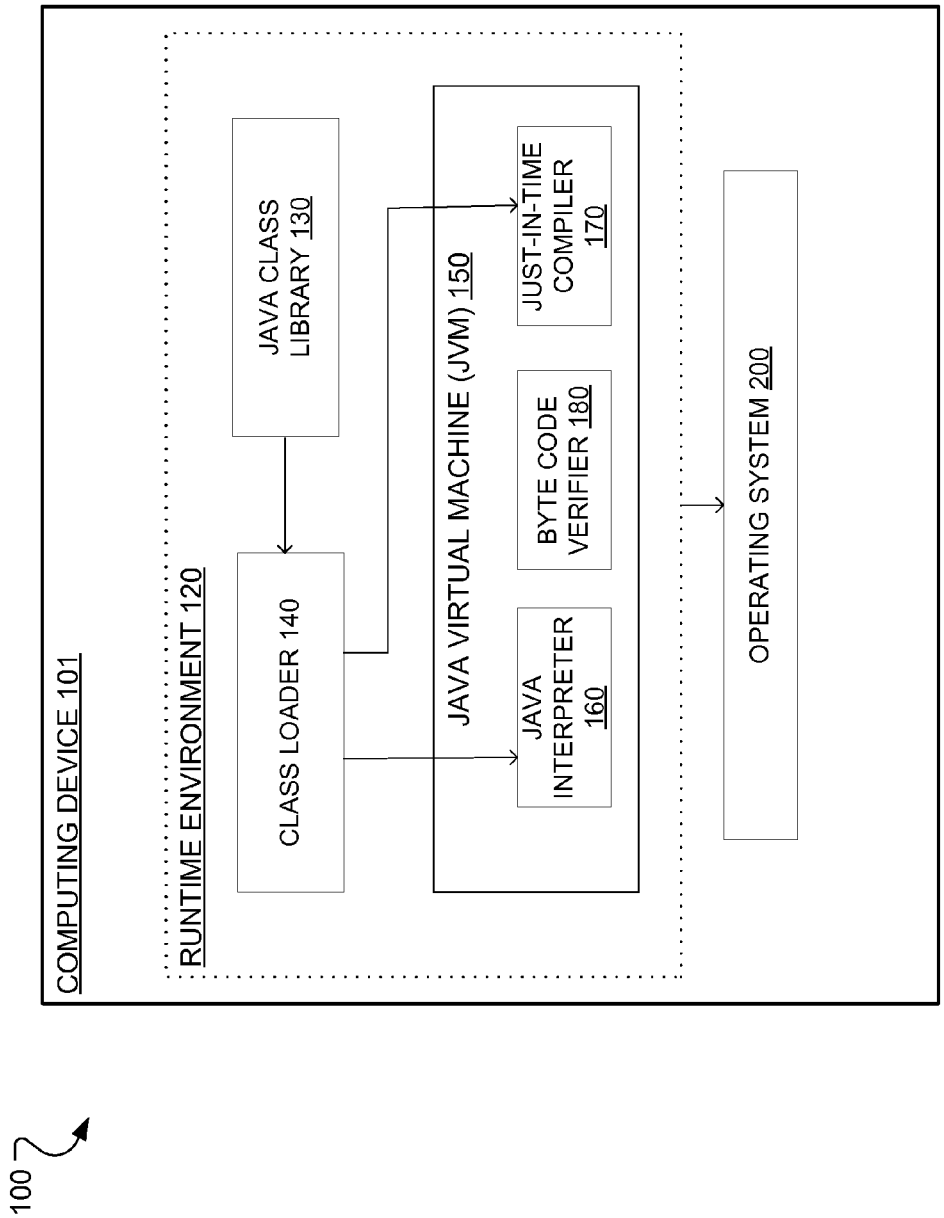
FIG. 1A is an example Java computing environment in accordance with one aspect of the present disclosure.

FIG. 1A illustrates a computing architecture 100 for generating and archiving metadata of a class-loader prior to executing an application in a runtime environment. The process is described in the context of the Java™ programming language, the Java™ Virtual Machine ("JVM"), and the Java™ Runtime Environment executing on a computing device, such as a computer, server, client, of any suitable type. It is contemplated, however, that the described techniques may be used for any programming language that supports class-loading in any appropriate context. And while aspects of the disclosure are illustrated in the context of a Java™ environment it is contemplated that such aspects may be applicable to other types of computing environments.

As illustrated in FIG. 1A, a run-time environment 120 includes a JVM 150 that includes various components, such as a Java™ interpreter 160 (which may include a garbage collector), a just-in-time (JIT) compiler 170, such as the HotSpot compiler, and/or a bytecode verifier 180 to check the validity of the executable code. The run-time environment 120 may run on top of lower-level software such as an operating system 200, in some embodiments.

In one embodiment, the JVM 150 represents a process virtual machine that executes bytecode stored or otherwise maintained within a Java™ class library 130. Generally speaking, the Java™ class library 130 represents a collection of related object code, typically packaged in one or more JAR files. A common type of object contained in a JAR file is a Java™ class file that represents a named, distinct unit of code.

Class files from the Java™ class library 130 may be identified by the class-loader 140 to load classes in the JVM 150. More specifically, the class-loader 140 is responsible for locating Java™ class files in the Java™ code library 130, reading their contents, and loading the classes into the JVM 150. The loading is typically performed dynamically, in that it does not occur until the class is actually requested by an executing computer program or software application. In the illustrated embodiment, code is loaded from the Java™ class library 130 into the JVM 150 (e.g., from a disk or over a network) by the class-loader 140. Thus, when the JVM 150 needs to load bytecode for a particular class, it requests the class-loader 140 to find the bytecode.

Class-loaders (e.g., class-loaders 140) contain a hierarchy with parent class-loaders and child class-loaders. The relationship between parent and child class-loaders is analogous to the object relationship of super classes and subclasses. The "bootstrap" class-loader is the root of the Java™ class-loader hierarchy. Thus, the JVM 150 may first request that a bootstrap class-loader (also referred to herein as the NULL class-loader) load the required class files (i.e. bytecode). Bootstrap classes are included in the "rt.jar" and several other JAR files in the "jre/lib" directory. These archives are specified by the value of the bootstrap classpath which is stored in the sun-.boot.class.path system property. The JVM 150 generates the bootstrap class-loader, which loads the Java™ development kit (JDK) internal classes and java.* packages included in the JVM 150. (For example, the bootstrap class-loader loads java.lang.String.)

Second, the JVM 150 may request that an "extension" class-loader load the required class files (i.e., bytecode). Extension classes are classes which extend the Java™ platform. Every .JAR file in the extension directory, jre/lib/ext (or java.ext.dirs), is assumed to be an extension and is loaded using the Java™ Extension framework. The extension class-loader is a child of the bootstrap class-loader. The extension class-loader loads any JAR files placed in the extension classpath.

Third, the JVM 150 may request that an "application" class-loader (also referred to as the "User class-loader) load the required bytecode or class files. Application classes are classes which build on the Java™ platform. To find application-type classes, the launcher refers to the application classpath—a list of directories, JAR archives, and ZIP archives which contain the desired class files.

Figure 1B:
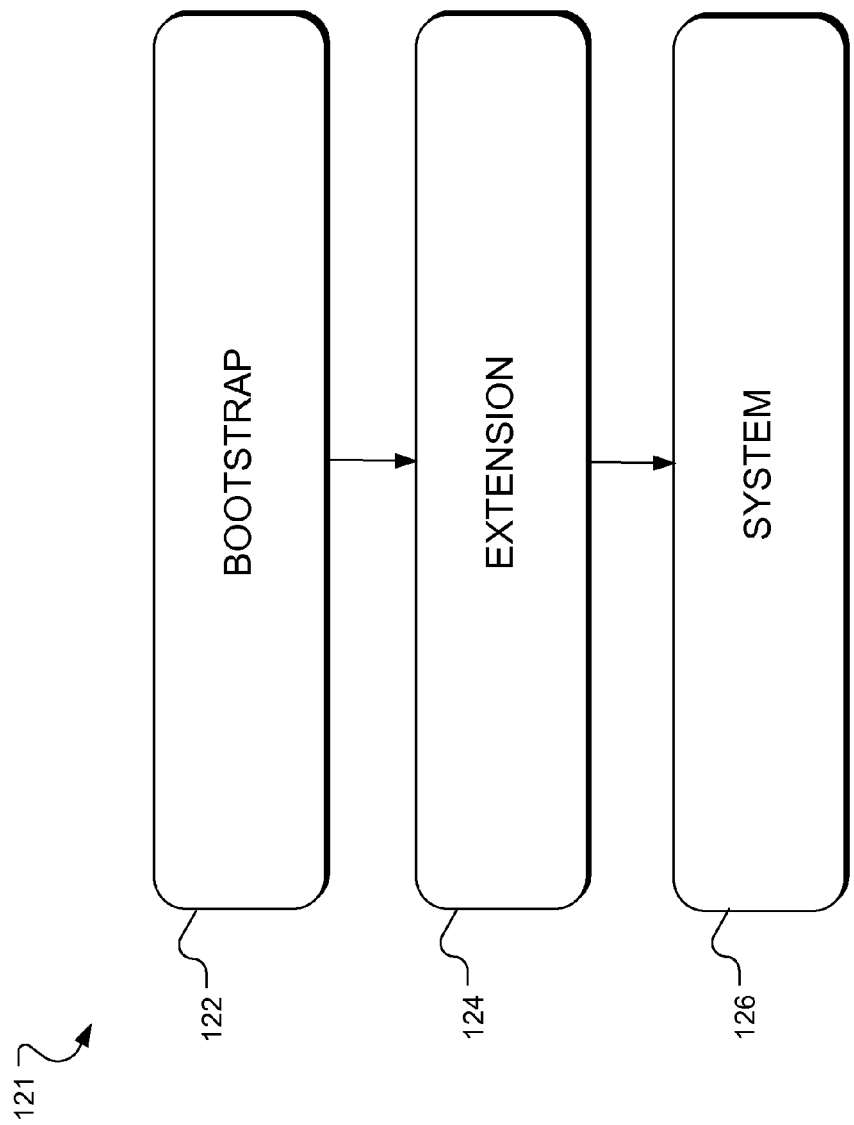
FIG. 1B is a block diagram illustrating a class loading architecture, in accordance with one aspect of the present disclosure.

FIG. 1B is a block diagram illustrating the class loading tree, or architecture, 121 in a Java 2 Standard Edition (J2SE) environment, for example, in accordance with one embodiment of the present invention. The J2SE environment includes a bootstrap class loader 122, an extension class loader 124, and a system class loader 126.

The bootstrap class loader 122 is responsible for loading the core Java classes. The bootstrap class loader 124 is unique in that it is not actually a subclass of "java.lang.ClassLoader" but is implemented by the JVM itself. The bootstrap class loader 122 loads classes in some default manner (e.g., from a local disk).

The extension class loader 124 is responsible for loading classes from the jars in the JRE's extension directory (e.g., jre/lib/ext or as specified by the java.ext.dirs system property). This provides a standard mechanism to introduce new functionality beyond the core Java classes introduced by the bootstrap class loader 122.

The system class loader 126 is responsible for loading classes from the directories and jars listed on the command-line and/or the "java.class.path" system property when the JVM is invoked. If not otherwise specified, any user-instantiated class loader will have this loader as its parent.

Class loading in the J2EE JVM environment is component based. That is, applications are not monolithic, rather they are collections of components (Enterprise JavaBeans ("EJBs"), Servlets, Java Server Pages ("JSPs"), Resource Adapters, etc.) that have predefined packaging (e.g., using JAR, Web Application Archive ("WAR"), and Roshal Archive ("RAR") files) and deployment directory structures as well as an umbrella packaging structure (e.g., Enterprise Archive ("EAR") files).

Class loading and linking using the standard extension and application class class-loaders may be a heavy weight and expensive process that often involves classpath searching, JAR file lookups, class verification, etc. In a typical application environment, the total class-loading time takes a large portion of the application startup time. Moreover, the memory containing class data loaded by the extension and application class-loaders in one process cannot be directly shared by other processes.

Class Data Sharing represents a process and/or mechanism that may address such issues by archiving loaded class metadata and storing the metadata into a re-mappable form before the execution of an application. More specifically, the Java™ runtime environment (e.g., runtime environment 120) loads a set of classes from the system JAR file into a private internal representation, and dumps that representation to a file, called a "shared archive." During subsequent JVM invocations, the shared archive is memory-mapped saving the cost of loading the classes stored in the shared archive and allowing much of the JVM's metadata for these classes to be shared among multiple JVM processes and/or Java™ applications. U.S. Pat. No. 7,814,472 entitled, "System And Method For Shared Code-Sourcing In A Java Virtual Machine Environment" and U.S. Pat. No. 7,954,096 entitled, "Shared Loader System And Method" further describe the concepts of class-loading and class data sharing, and the disclosures of both patents are hereby incorporated by reference in their entirety.

The classes included in the shared archive, however, are handled as trusted system classes and have no notion of class-loader other than the NULL class-loader. Thus, classes from the extension and application classpath cannot be put into the archive without violating the class-loader context and Java™ semantics, which can cause incorrect runtime behavior and security vulnerability. Aspects of the present disclosure involve the storage, in the class archive, of additional metadata that identifies classes from the extension classpath and application classpath. The metadata may be also used by the extension classpath and application classpath class-loaders to load classes at runtime and perform security checks and/or other verifications to ensure that all class-loader contexts and Java™ semantics are satisfied.

Figure 2:
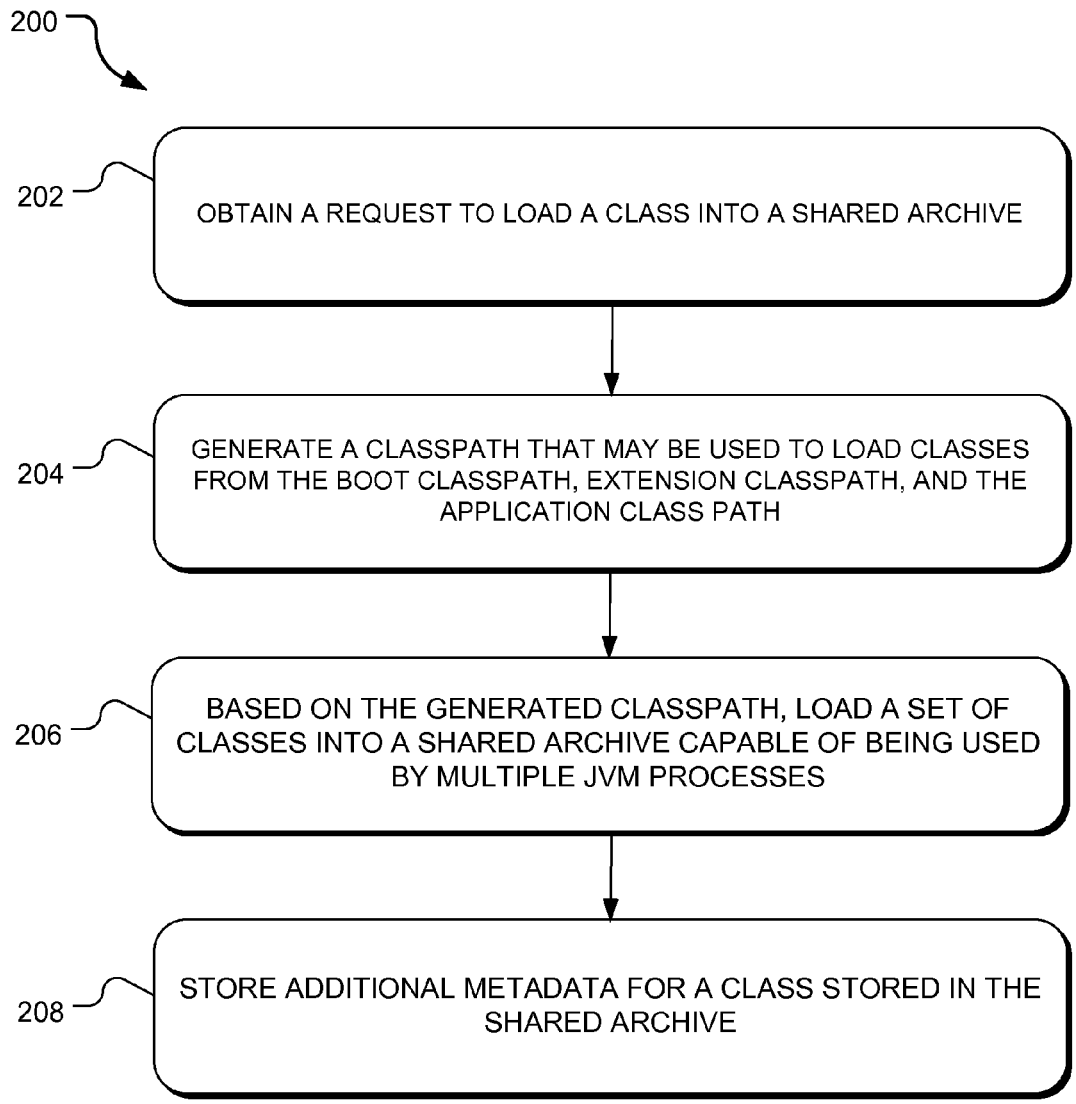
FIG. 2 is an example process for archiving metadata for classes stored in a shared archive, in accordance with one aspect of the present disclosure.

FIG. 2 provides an example process 200 for archiving metadata for classes stored in a shared archive. As illustrated, the process 200 begins with obtaining a request to load a class, or multiple classes into an internal representation referred to as a "shared archive" (operation 202). Referring to FIG. 1, and in one embodiment, the JVM 150 requests that the class-loader 140 load one or more classes from the class library 130. Referring again to FIG. 2, in one embodiment, before any classes are loaded in the shared archive and in response to the request, a new all-inclusive classpath is generated that may be used to ensure that classes from all class-loaders—the boot classpath, the extension classpath and application classpath (in addition to the boot classpath) may be stored in the shared archive and loaded by their respective class-loaders at runtime (operation 204). In one embodiment, the new classpath is generated by appending the extension classpath to the boot classpath and then appending the application classpath to the extension classpath to generate a new classpath for loading all classes during dump time. Appending all of the different classpaths together to generate the new classpath preserves class-loader delegation order. The new classpath may be saved as a classpath table in the shared archive.

Figure 3:
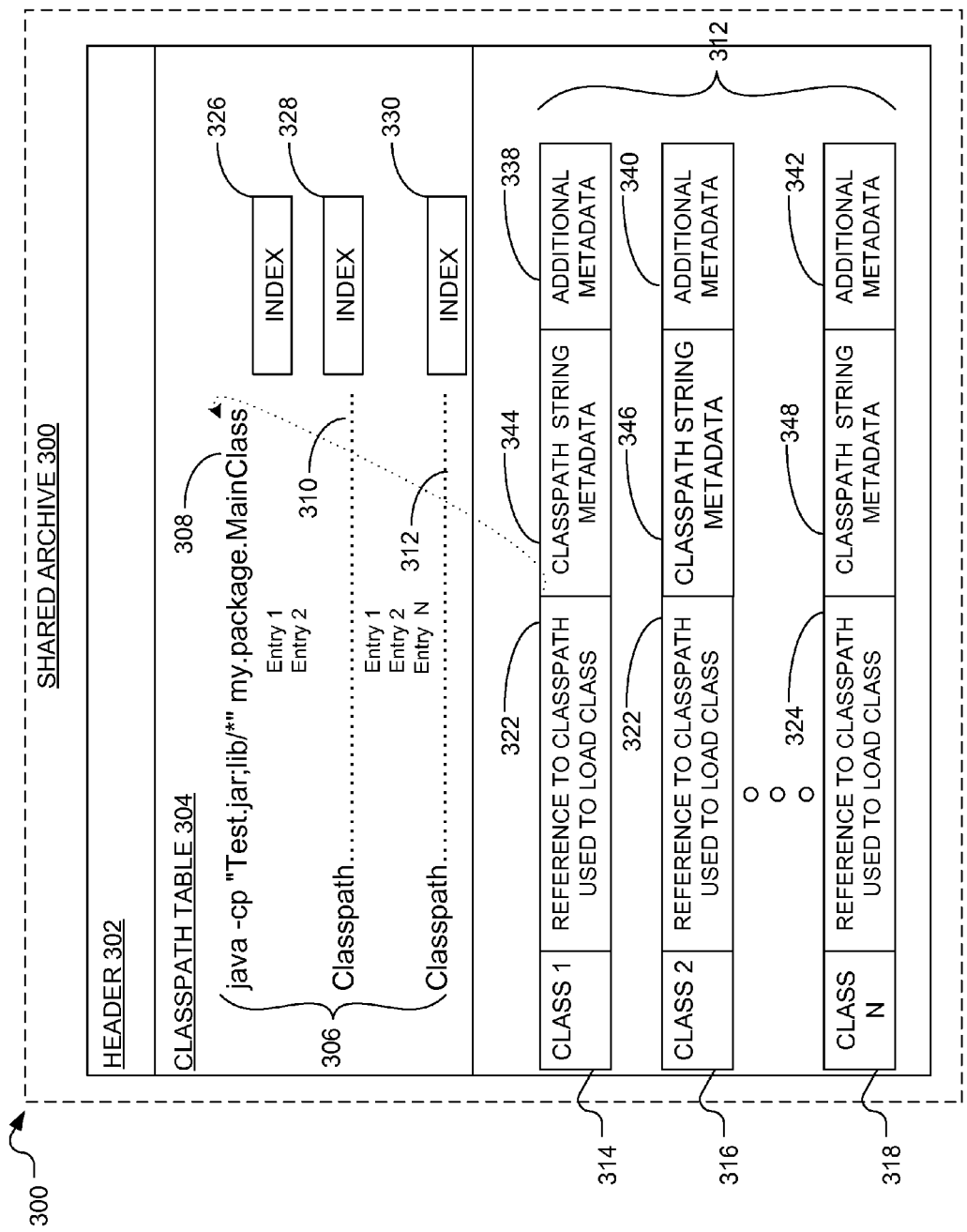
FIG. 3 is an example block diagram of a shared archive, in accordance with one aspect of the present disclosure.

FIG. 3 illustrates an example shared archive 300, according to one embodiment. The shared archive 300 includes a header 302 and a classpath table 304 that represents the newly generated classpath that is capable of being used to load classes from the boot classpath, the extension classpath and the application classpath. In one embodiment, the classpath table may be stored in the header 304 of the generated shared archive.

The classpath table 304 included in the shared archive 300 includes three classpaths; classpath 308 represents the boot classpath, classpath 310 represents the extension classpath, and classpath 312 represents the application classpath. Each classpath may include one or more entries (illustrated as Entry 1, Entry 2, and/or Entry N) and each classpath is indexed according to its individual entries. Thus, classpath 308 will have two entries indexed as 1 and 2, classpath 310 will have at least two entries up to N entries, and so on. It is contemplated that any classpath could have any number of entries.

According to one embodiment, indices identifying the first boot classpath entry, the first extension classpath entry, and first application classpath entry may be recorded and used to identify the original type (boot, extension, or application) of each classpath entry included the classpath table 300. The first index starts with the boot classpath because the boot classpath was the first classpath added when generating the new all-inclusive classpath. Thus, in the illustrated embodiment, index 326 is recorded with classpath "Entry 1" of classpath 308 indicating that the type of classpath of entry 310 is the boot classpath type. All entries sequentially following classpath Entry 1 of classpath 308 are considered to be of the boot classpath type until another index is recorded signifying a change in type. In the illustrated embodiment, index 328 is recorded with classpath Entry 1 of classpath 310 indicating that the type corresponding to classpath Entry 1 of classpath 310 is the extension classpath type. All entries sequentially following sequentially following classpath Entry 1 of classpath 310 are considered to be of the extension classpath type until a new index is recorded signaling that that the type of the classpath is changing. In the illustrated embodiment, index 330 is recorded indicating that the type of classpath 312 is the application classpath type, and so on.

Referring back FIG. 2, based on the generated classpath, one or more classes are loaded and stored in the shared archive in a manner that enables the classes to be accessed (i.e., loaded and used) by multiple JVM processes (e.g., applications) (operation 206). Referring to FIG. 1 and in one embodiment, the JVM 150 may employ the boot (NULL) class-loader (e.g., the class loader 140) load one or more classes from the class library 130. In one embodiment, the JVM 150 may access a pre-stored list of required classes to determine which classes need to be loaded and stored in the shared archive. The JVM 150 employs class data sharing mechanisms to store the classes loaded by the class loader 140 in a private, internal representation, in memory and then dumps (referred to herein as "dump time" and/or "dumping") the representation into a "shared archive" file. The boot (NULL) class-loader is used to ensure that no Java code is actually executed during class archiving.

Referring again to FIG. 3, classes 1 through N (314, 316, and 318) are loaded into the shared archive 300. As each class is being loaded, a reference and/or pointer to the classpath (e.g., the Jar file from which the class was originally) is stored in the shared archive as class data. Thus, as "class 1" 314 is being loaded and stored in the shared archive, a reference and/or pointer 320 is stored in the shared archive 300. In the illustrated embodiment, the reference 320 indicates that the classpath "Java-cp "Test.jar;lib/*" my.package.MainClass" was used to originally load the class. As "class 2" 316 is being loaded and stored in the shared archive, a reference and/or pointer 322 is stored in the shared archive 300 indicating the classpath (e.g., the Jar file) from which class 2 was originally loaded. Any number of classes may be loaded into the shared archive 300, each of which will include a reference and/or pointer to the classpath (e.g., the Jar file) from which it was loaded, as illustrated by "class N" 318 and reference 324.

Referring back to FIG. 2, as classes are being stored into the shared archive, additional metadata (in addition to normal class data generated by class data sharing processes) may be stored in the shared archive to ensure that classes from the extension class and application classes may be loaded by their respective class-loaders at runtime (operation 208). In the illustrated embodiment, any metadata being added and stored with a class in the archive is referred to as additional metadata. Thus, as illustrated, additional metadata is added to each class 314-318 at 338, 340, and 342. As explained above, the additional metadata may include and information required to identify classes from the extension classpath and application classpath, perform security checks and/or other verifications, and ensure that all class-loader contexts and Java™ semantics are satisfied. The additional metadata may include flags, new path strings, timestamps, and/or the like may be stored as additional metadata, as will be described in detail below.

For example and in one embodiment, as each class 314-318 is being loaded into the shared archive 300, a flag may be set and stored as metadata at 338, 340 and 342, respectively. The flag identifies the type of the class being loaded in the shared archive. More specifically, as class 314 is being loaded and stored in the shared archive, a flag indicating the class is of type boot is set and stored in the metadata at 338. As class 316 is being loaded and stored in the shared archive, a flag indicating the class is of type "application" is set and stored to the metadata at 340. As class 318 is being loaded and stored in the shared archive, a flag indicating the class is of type extension is set and stored to the metadata at 342. In one embodiment, the flag may be set by accessing variables corresponding to the class at the virtual machine representation level. Specifically, the highest two bits in the InstanceKlass::_misc_flags of the loaded class may be used to specify the type of the class, with the bit being set as: 0x0 for the boot class; 0x1 for the extension class; and 0x2 for the application class.

In addition to storing class type metadata (e.g., the flag), other metadata identifying the specific JAR file path string of the class being loaded may be stored in the shared archive. For example, as class 316 is being loaded and stored in the shared archive, the original classpath string may be stored. As class 314 is being loaded and stored in the shared archive, metadata containing the original classpath string defining the classpath from which the class was loaded is stored at 344. As class 316 is being loaded and stored in the shared archive, metadata containing the original classpath string defining the classpath from which the class was loaded is stored at 346. As class 318 is being loaded and stored in the shared archive, metadata containing the original classpath string defining the classpath from which the class was loaded is stored at 348 and so on.

In addition to the Jar file path string, a timestamp indicating when the classpath was accessed may also be stored in the shared archive as metadata. Thus, as class 314 is being loaded and stored in the shared archive, a timestamp indicating when the Jar file identified in the Jar file classpath was accessed is added as additional metadata at 338. As class 316 is being loaded and stored in the shared archive, a timestamp indicating when the Jar file identified in the Jar file classpath was accessed is added as additional metadata at 340. As class 318 is being loaded and stored in the shared archive, a timestamp indicating when the Jar file identified in the Jar file classpath was accessed is added as additional metadata at 342.

Manifest data for a Jar file classpath, in the form of metadata, may also be stored in the shared archive as additional metadata. Generally speaking, manifest data for a Jar file list the contents of the Jar file, defines extension and package-related data of the Jar file, and may also contain information about other files that are packaged in the Jar file. Thus, as class 314 is being loaded and stored in the shared archive, a timestamp indicating when the Jar file (identified in the Jar file classpath) was accessed is added to the metadata at 338. As class 316 is being loaded and stored in the shared archive, a timestamp indicating when the Jar file (identified in the Jar file classpath) was accessed is added to the metadata at 340. As class 318 is being loaded and stored in the shared archive, a timestamp indicating when the Jar file identified in the Jar file path was accessed is added to the metadata at 342. In yet another embodiment, resource data, in the form of metadata, may also be stored in the shared archive for faster resource loading. When all classes and resources from a JAR file are archived, the original JAR file can be eliminated to save static memory.

In one embodiment, bytecode verification may be performed on all classes stored in the archive. More specifically, when an application and/or extension class loader presents bytecodes of a newly loaded Java class to the JVM 150, the bytecodes may first be inspected and verified to ensure that the instructions are correct cannot perform actions that are damaging. Specifically and in one embodiment, bytecode verification for the extension and application classes may be performed at dump time. If a class is verified successfully, the class' state is set to "linked" in the class metadata. If a class fails verification, for example due to a missing parent class, the class is marked in the metadata as being in an "error" state. Any classes in the "error" state are removed from the system dictionary when writing or otherwise storing classes in the shared archive. At runtime, no verification will be re-performed for those classes which have been successfully verified during dump time.

In another embodiment, a class may fail verification due to a bad class format or because the class contains bad code. In such an event, the class will be marked in the metadata as being in an "error" state and will also be removed from the system directory at dump time. At runtime, when such a class is requested, it will be loaded dynamically and verified normally. A verification error will be thrown by the JVM accordingly.

All of the stored class data and/or additional metadata may be used to ensure that the application classpath and extension classpath classes are able to be stored in the shared archive and loaded by their respective class loaders at run-time for multiple JVM processes. Additionally, the class data and added metadata allows for various security checks to be performed when loading the classes.

Figure 4:
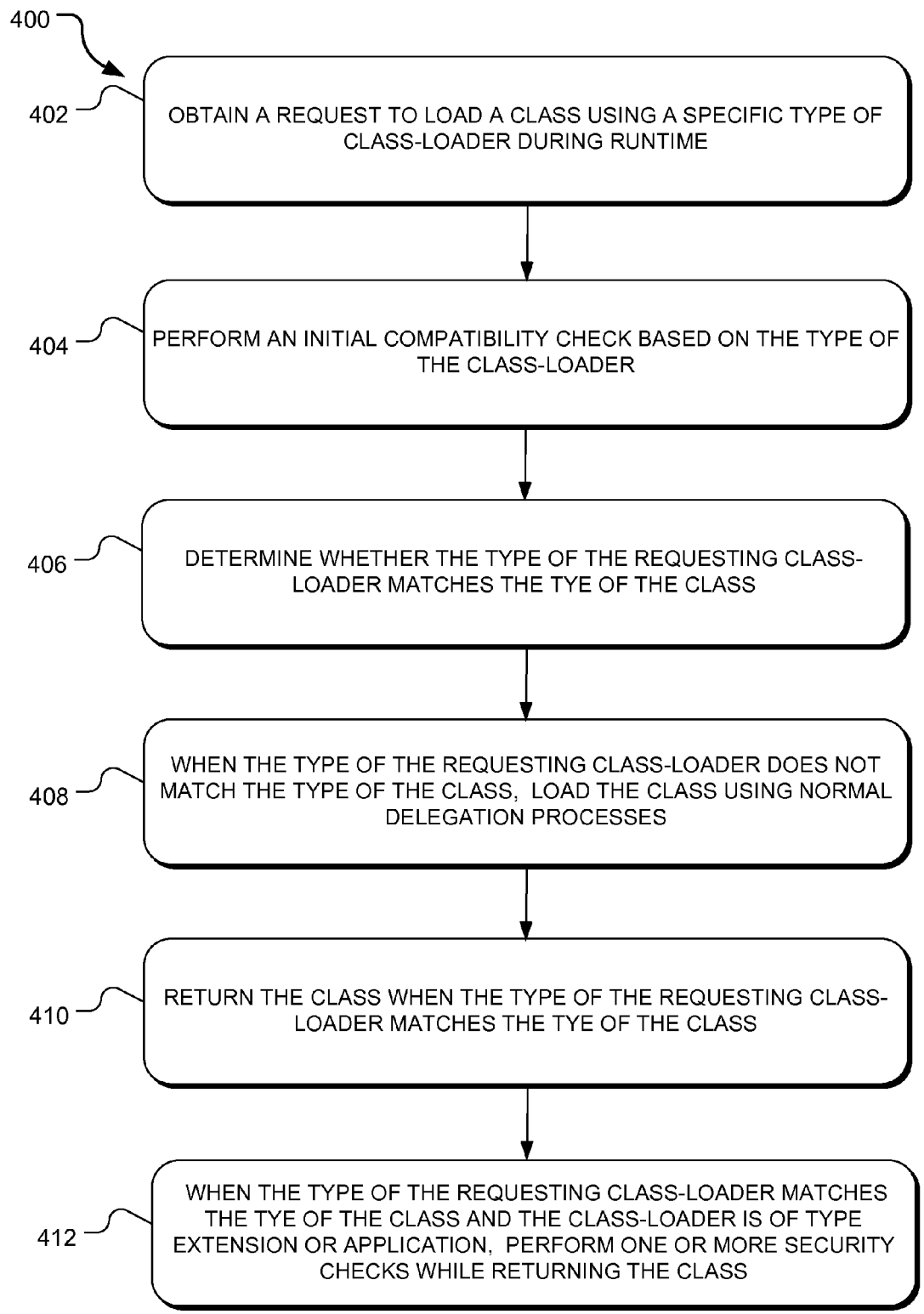
FIG. 4 is an example process for loading a class stored in a shared archive, in accordance with one aspect of the present disclosure.

FIG. 4 illustrates a process 400 for loading class files from the shared archive at run-time. The process begins with obtaining a request for a particular type of class-loader to load a class during runtime (operation 402). Referring to FIG. 1, the JVM 150 requests that the class loader 140 load a class from various JAR files included in the Java class library 130. The request could be obtained from any type of class-loader including the boot class-loader, the extension class-loader, or the application class-loader. For example, assume a class-loader "A" is requesting to load class 314 of FIG. 3 at runtime and that the class-loader is an extension type class-loader.

In one embodiment, in response to the class-loader request, the JVM 150 may perform an initial compatibility security check based on the type of the class loader (operation 404). For example, if the class-loader is a boot or extension type class-loader, the JVM 150 may verify that that boot classpath and extension classpath directories used at dump time match at runtime, as the contents of the extension directories must not change. If the class-loader is an application type, the JVM may verify that application classpath (-cp) used at dump time is equal to, or a proper prefix of, the application classpath at runtime, as new path components may be appended at the end of application classpath at runtime. Violation of any of the path requirements will invalidate the dumped shared archive, and no classes from the shared archive will be loaded during the runtime.

Once the compatibility check has been performed, it is determined whether the type of the requesting class-loader matches the type of the requesting class that the class-loader is attempting to load (operation 406). Referring to the example above, class 314 will only be returned to the class-loader A if the type of class-loader A matches type of the requested class 314 (i.e., the extension class type). In one embodiment, to determine whether there is a match, the type of the requesting class-loader is compared to the flag stored in additional metadata 338. As stated above, the flag may be set based on the type of the class. If the types do not match, the class is not returned, and the class-loader delegates the process to the parent class-loader, which then loads the class according to normal delegation processes (operation 408). If the types match, the class is returned to the requesting class-loader (operation 410).

If the types match and the requesting class-loader is an extension class-loader or an application class-loader, various security checks and runtime efficiencies may be performed and/or otherwise achieved to ensure that all class-loader contexts and Java semantics are satisfied, even though the class is being loaded from the shared archive using an extension type class-loader or an application type class-loader. Such security checks and runtime efficiencies may include, for example: Fast Runtime Protection Domain; Manifest, Package, and Package Sealing; and Pre-Verification, among others (operation 412).

Pre-Verification

In one embodiment, fast runtime protection domain and package handling may be achieved when the requesting class-loader is an extension type class-loader or an application type class-loader. As explained above, bytecode verification for extension and application classes may be performed during shared archive dumping time and before runtimer. When the class fails verification due to missing parent class at dump time, the class is flagged as an error and then removed from the system dictionary in the shared archive. At runtime, the class loaded dynamically and verification is performed on the dynamically loaded class data.

Fast Runtime Protection Domain

In one embodiment, fast runtime protection domain and package handling may be achieved when the requesting class-loader is an extension type class-loader or an application type class-loader. In some cases, a class will be loaded from a Jar file that was not previously verified by the JVM 150. Stated differently, the class will be loaded and stored into the shared archive even though the Jar file from which the class was loaded was not officially verified and signed (referred to as an "unsigned Jar file") by the JVM 150. The ability to sign and verify Jar files is an important part of the Java's security architecture. For example, the policy file of the JRE 120 may insist that classes coming from particular Jar file path location be signed by a particular entity before granting a particular set of permissions.

Security for a class is also controlled, in part, by the protection domain that is in force at runtime. Generally speaking, a protection domain represents all the permissions that are granted to a particular code source, such as a class. Stated differently, a protection domain ensures that all classes that belong to it are treated the same because they originate from the same location and were signed (as explained above) by the same entity.

In the Java context, a protection domain is a grouping of a code source and permissions—that is, a protection domain represents all the permissions that are granted to a particular code source or class. In the default implementation of the Policy class, a protection domain is one grant entry in the file. A protection domain is an instance of the ProtectionDomain class (java.security.ProtectionDomain) and is constructed as follows:

public ProtectionDomain(CodeSource cs, Permission-
       Collection p)

The above instance constructs a protection domain based on the given code source "cs" and set of permissions "p". Thus, when associated with a class, the example protection domain instance above means that the given class was loaded from the site specified in the code source "cs", was signed by the public keys specified in the code source "cs", and should have permission to perform the set of operations represented in the permission collection object "p". Each class may belong to one and only one protection domain, which is set by the class loader when the class is defined.

All classes loaded from the same unsigned JAR file can share the same protection domain when they are being loaded by the same type of class-loader. As explained above, each class stored in the shared archive contains a pointer/index to the Jar file path string from which it was originally loaded. Thus, when a class is loaded from the shared archive and the shared path index is pointing to an extension or application path entry, a ProtectionDomain Java™ instance (if one has not already been created) may be generated using the Jar file path string. The generated ProtectionDomain instance is cached into an array. The index of the ProtectionDomain in the cache array is the same as the corresponding Jar file path entry index stored as metadata in the shared class path table for the loaded class. Subsequently, when classes from the same JAR file are loaded from the archive, the cached ProtectionDomain instance is used and set for those classes, providing faster access to the cached ProtectionDomain by the JVM 150.

Package Generation and Sealing and Manifest Generation

In one embodiment, package generation and sealing and/or manifest generation may be achieved when the requesting class-loader is an extension type class-loader or an application type class-loader.

Generally speaking, package handling refers to how Java packages are generated, manipulated, and/or used in the JVM and the Java environment. Generally speaking, a package is a namespace that organizes a set of related classes and interfaces. Because software written in the Java programming language can be composed of hundreds or thousands of individual classes, classes are often organized by placing related classes and interfaces into packages.

One example of package handling includes package sealing. Packages included within JAR files can be optionally sealed, which means that all classes defined in that package must be archived in the same JAR file. A package may be sealed, for example, to ensure version consistency among the classes included in the package. Manifest data list the contests of the Jar file from which the class is being loaded and contains information about the files packaged in the JAR file. In particular, the manifest data includes attributes that help ensure the security of packaged classes.

When a class-loader instance defines the first class from a package, it defines the Package object that the class belongs to using the attributes contained in the JAR file manifest. The defined Package object is then cached. A Package is considered as 'sealed' if the manifest contains "Sealed: true" attribute for the specific package name (or the whole JAR file). Package sealing is checked by the class-loader when loading subsequent classes within the same package to make sure the new classes are from the same URL base if the package is sealed. The cached Package object is used to perform a package sealing check.

As explained above, manifest data may be stored in the shared class path table for a JAR file path, along with the path string. Thus, for application and extension classes loaded from the shared archive, Manifest and Package java objects may be generated. When an extension or application class is found in the shared archive, if the containing JAR file path entry does not have a cached Manifest instance, a Manifest java instance is created and stored in an array. The index of the Manifest instance in the cache array is the same as the corresponding Jar file path entry index stored as metadata in the shared class path table for the loaded class. Subsequently, the cached Manifest is used by all classes with the same JAR file path loaded from the shared archive. Using the Manifest instance, the VM does upper call into Java to let the ClassLoader instance handle the package define and sealing check for the class, as is generally understood in the art, in a more direct and efficient manner.

Other Processes Associated with Loading a Class

Regardless of whether code is Java code being loaded on a platform that conforms to Java standards or other code being loaded to another platform that conforms to other standards of another programming language, functional difficulties may exist when attempting to load the code. For example, loading and linking class files or other code files using a class-loading mechanism of a programming language other than Java may be a heavy weight and expensive process that often involves file path searching, archive file lookups, code file verification, etc. Additionally, memory containing the class files in one class-loading process may not be directly shared by other class-loading processes.

To remedy such issues, class-loading mechanisms implemented within the programming language may be used to load the classes into a re-usable archive that allows multiple executing processes to access the archived class data. Additionally, metadata may be added to the archive that enables processes to perform security checks and/or other verifications, such as verifying that the correct version of the class file is being loaded, verify that the executing processes have access to all of the appropriate archive files, versions, etc.

Figure 5:
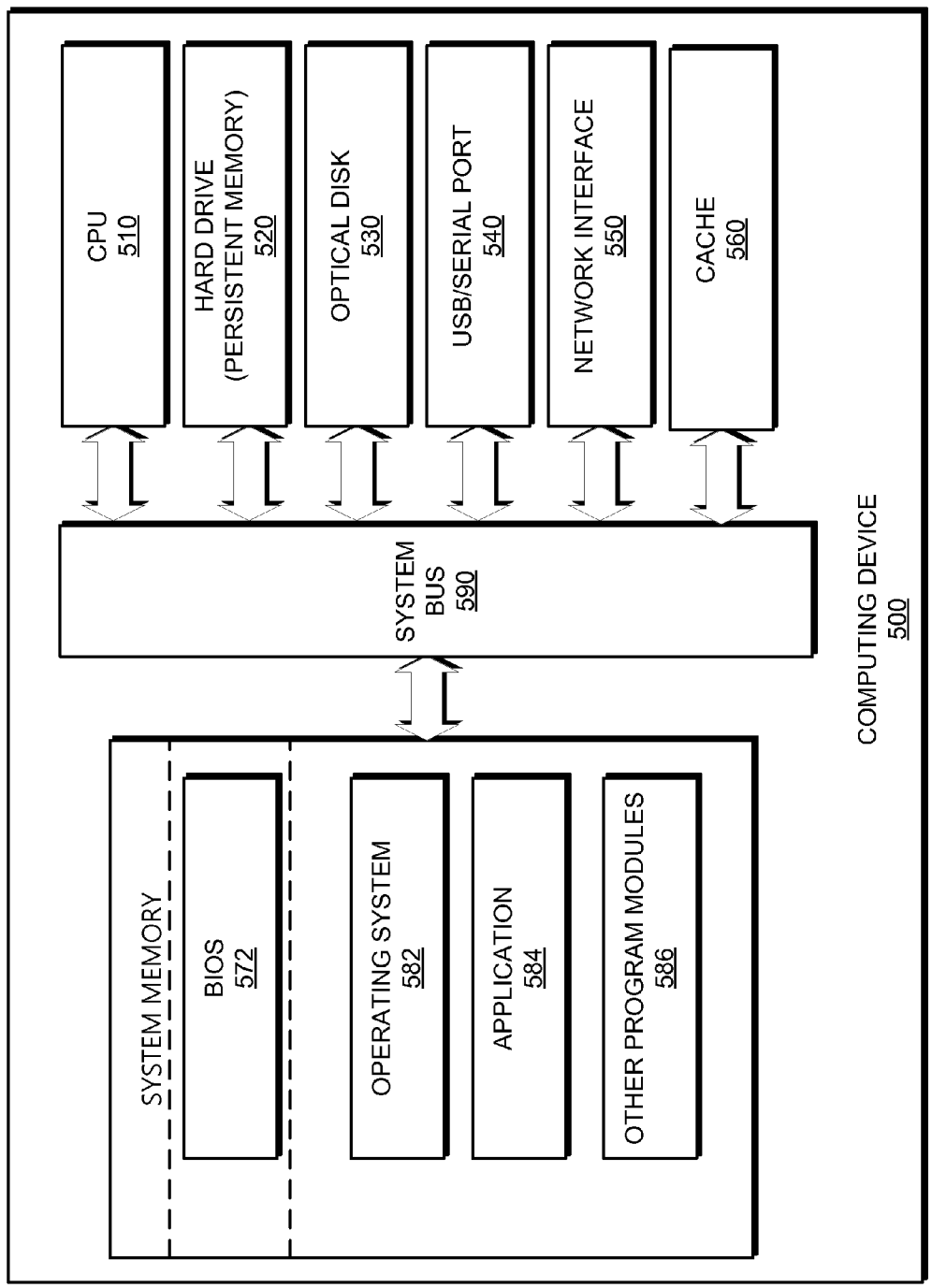
FIG. 5 is an example computing device configured to implement various class loading procedures, in accordance with one aspect of the present disclosure.

FIG. 5 illustrates a computing device 500 that may be useful in implementing the described systems. The example hardware and operating environment of FIG. 5 for implementing the described technology includes a computing device, such as general purpose computing device in the form of a personal computer, server, or other type of computing device. In the implementation of FIG. 5, for example, the computing device 500 includes a processor 510, a cache 560, a system memory 520 and a system bus 590 that operatively couples various system components including the cache 560 and the system memory 520 to the processor 510. There may be only one or there may be more than one processor 510, such that the processor of the computing device 500 comprises a single central processing unit (CPU), or a plurality of processing units, commonly referred to as a parallel processing environment. The computing device 500 may be a conventional computer, a distributed computer, or any other type of computer; the disclosure included herein is not so limited.

The system bus 590 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) and random access memory (RAM). A basic input/output system (BIOS), containing the basic routines that help to transfer information between elements within the computing device 500 such as during start-up may be stored in ROM. The computing device 500 further includes a hard disk drive 520 for reading from and writing to a persistent memory such as a hard disk, not shown and an optical disk drive 530 for reading from or writing to a removable optical disk such as a CD ROM, DVD, or other optical medium.

The hard disk drive 520 and optical disk drive 530 are connected to the system bus 590. The drives and their associated computer-readable medium provide nonvolatile storage of computer-readable instructions, data structures, program engines and other data for the computing device 500. It should be appreciated by those skilled in the art that any type of computer-readable medium which can store data that is accessible by a computer, such as magnetic cassettes, flash memory cards, digital video disks, random access memories (RAMs), read only memories (ROMs), and the like, may be used in the example operating environment.

A number of program engines may be stored on the hard disk, optical disk, or elsewhere, including an operating system 582, an application 584, and one or more other application programs 586. A user may enter commands and information into the computing device 500 through input devices such as a keyboard and pointing device connected to the USB or Serial Port 540. These and other input devices are often connected to the processor 510 through the USB or serial port interface 540 that is coupled to the system bus 590, but may be connected by other interfaces, such as a parallel port. A monitor or other type of display device may also be connected to the system bus 590 via an interface (not shown). In addition to the monitor, computers typically include other peripheral output devices (not shown), such as speakers and printers.

The embodiments of the present disclosure described herein are implemented as logical steps in one or more computer systems. The logical operations of the present disclosure are implemented (1) as a sequence of processor-implemented steps executing in one or more computer systems and (2) as interconnected machine or circuit engines within one or more computer systems. The implementation is a matter of choice, dependent on the performance requirements of the computer system implementing aspects of the present disclosure. Accordingly, the logical operations making up the embodiments of the disclosure described herein are referred to variously as operations, steps, objects, or engines. Furthermore, it should be understood that logical operations may be performed in any order, unless explicitly claimed otherwise or a specific order is inherently necessitated by the claim language.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the disclosure and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

What is claimed is:

1. A method of reducing load time of an application comprising:
   prior to execution of an application at a computing device:
      storing, in a memory included in the computing device, metadata, in an archive, the metadata corresponding to a class loading operation used to load a class required by the application, wherein the metadata identifies a type of the
   class loading operation and wherein different types of class loading operations perform different security checks as a part of loading classes; and
   during execution of the application at the computing device:
      based on a request comprising an indication for the class loading operation to load the class, determining, based on the metadata, whether the class is stored in the archive; and
      when the class is stored in the archive:
         loading, by a particular class loading operation of a particular type, the class from the archive;
         checking that the particular type of the class loading operation matches the type of the class loading operation in the metadata; and
         wherein the metadata further includes a classpath location of the class loaded by the class loading operation and wherein determining, based on the metadata, whether the class is stored in the archive comprises verifying that the classpath location is valid.

2. The method of claim 1, wherein the class loading operation is at least one of a null class loading operation, an extension class loading operation, and an application class loading operation.

3. The method claim 1, further comprising:
   based on the type of the class loading operation, performing at least one of preserved class-loading delegation, class re-verification, package handling, protection-domain creation, and protection-domain caching.

4. The method of claim 3, further comprising storing the protection domain in an array.

5. The method of claim 1, further comprising:
   when the particular type of the particular class loading operation indicates the particular class loading operation is an application class loading operation, reconstruct a protection domain instance and a package instance for the class by:
      accessing manifest data located in the archive; and
      initiate an application programming interface that reconstructs the protection domain and the package based on the manifest data.

6. The method of claim 1, further comprising:
   when the particular type of the particular class loading operation indicates the particular class loading operation is an extension class loading operation or application class loading operation:
      determine whether bytecode verification of the class failed when the class was archived; and
      when it is determined that the bytecode verification failed, remove the class from the archive during archive creation; and
      during execution of the application, load the class according to normal class-loading delegation mechanisms.

7. The method of claim 1, further comprising:
   when the class is not found in the archive, use the particular class loading operation to load the class according to normal class-loading delegation mechanisms.

8. The method of claim 1, wherein the metadata is automatically archived according to a private representation by a virtual machine installer prior to the execution of the application.

9. A non-transitory computer readable medium encoded with instructions for reducing load time of an application, the instructions, executable by a processor, comprising:
   prior to execution of an application by the processor:
      storing, in a memory included in the computing device, metadata in an archive, the metadata corresponding to a class loading operation used to load a class required by the application, wherein the metadata identifies a type of the class loading operation and wherein different types of class loading operations perform different security checks as a part of loading classes; and
   during execution of the application by the processor:
      based on a request comprising an indication for the class loading operation to load the class, determining, based on the metadata, whether the class is stored in the archive; and
      when the class is stored in the archive:
         loading, by a particular class loading operation of a particular type, the class from the archive;
         checking that the particular type of the class loading operation matches the type of the class loading operation in the metadata; and
         wherein the metadata further includes a classpath location of the class loaded by the class loading operation and wherein determining, based on the metadata, whether the class is stored in the archive comprises verifying that the classpath location is valid.

10. The non-transitory computer readable medium of claim 9, wherein the class loading operation is at least one of a null class loading operation, an extension class loading operation, and an application class loading operation.

11. The non-transitory computer readable medium of claim 10, further comprising:
    based on the type of the class loading operation, performing at least one of preserved class-loading delegation, class re-verification, package handling, protection-domain creation, and protection-domain caching.

12. The non-transitory computer readable medium of claim 9, further comprising:

when the particular type of the particular class loading operation indicates the particular class loading operation is an application class loading operation, reconstruct a protection domain instance and a package instance for the class by:
accessing manifest data located in the archive; and
initiate an application programming interface that reconstructs the protection domain and the package based on the manifest data.

13. The non-transitory computer readable medium of claim 12, further comprising storing the protection domain in an array.

14. The non-transitory computer readable medium of claim 9, further comprising:
when the particular type of the particular class loading operation indicates the particular class loading operation is an extension class loading operation or application class loading operation:
determine whether bytecode verification of the class failed when the class was archived; and
when it is determined that the bytecode verification failed, remove the class from the archive during archive creation; and
during execution of the application, load the class according to normal class-loading delegation mechanisms.

15. The non-transitory computer readable medium of claim 9, further comprising:
when the class is not found in the archive, use the particular class loading operation to load the class according to normal class-loading delegation mechanisms.

16. The non-transitory computer readable medium of claim 9, wherein the metadata is automatically archived according to a private representation by a virtual machine installer prior to the execution of the application.

* * * * *